United States Patent
Cobb

(10) Patent No.: US 9,899,669 B2
(45) Date of Patent: Feb. 20, 2018

(54) STRUCTURES FOR INTERDIGITATED FINGER CO-EXTRUSION

(71) Applicant: Palo Alto Research Center Incorporated, Palo Alto, CA (US)

(72) Inventor: Corie Lynn Cobb, Mountain View, CA (US)

(73) Assignee: PALO ALTO RESEARCH CENTER INCORPORATED, Palo Alto, CA (US)

( * ) Notice: Subject to any disclaimer, the term of this patent is extended or adjusted under 35 U.S.C. 154(b) by 411 days.

(21) Appl. No.: 13/727,937

(22) Filed: Dec. 27, 2012

(65) Prior Publication Data

US 2014/0186697 A1 Jul. 3, 2014

(51) Int. Cl.
| | |
|---|---|
| *H01M 4/36* | (2006.01) |
| *B29C 47/06* | (2006.01) |
| *H01M 4/131* | (2010.01) |
| *H01M 4/04* | (2006.01) |
| *H01M 4/1391* | (2010.01) |
| *H01M 4/485* | (2010.01) |
| *H01M 4/505* | (2010.01) |
| *H01M 4/525* | (2010.01) |
| *H01M 10/0525* | (2010.01) |
| *H01M 4/02* | (2006.01) |

(52) U.S. Cl.
CPC .......... *H01M 4/366* (2013.01); *B29C 47/06* (2013.01); *H01M 4/131* (2013.01); *H01M 4/0411* (2013.01); *H01M 4/1391* (2013.01); *H01M 4/485* (2013.01); *H01M 4/505* (2013.01); *H01M 4/525* (2013.01); *H01M 10/0525* (2013.01); *H01M 2004/021* (2013.01)

(58) Field of Classification Search
CPC .... H01M 4/366; H01M 4/1391; H01M 4/485; H01M 2004/021; H01M 4/505; H01M 10/0525; H01M 4/525; H01M 4/131; H01M 4/0411; B29C 47/06
USPC ....................................................... 429/209
See application file for complete search history.

(56) References Cited

U.S. PATENT DOCUMENTS

| | | |
|---|---|---|
| 3,195,865 A | 7/1965 | Harder |
| 3,382,534 A | 5/1968 | Veazey |
| 3,583,678 A | 6/1971 | Harder |

(Continued)

FOREIGN PATENT DOCUMENTS

| | | |
|---|---|---|
| EP | 0802034 | 10/1997 |
| EP | 1757429 | 2/2007 |

(Continued)

OTHER PUBLICATIONS

Fergus et al., "Recent Developments in Cathode Materials for Lithium Ion Batteries," Journal of Power Sources, Elsevier SA, Ch. vo. 195, No. 4, Feb. 15, 2010, pp. 939-954, XP026693512.

(Continued)

*Primary Examiner* — Jonathan Jelsma
*Assistant Examiner* — Omar Kekia
(74) *Attorney, Agent, or Firm* — Marger Johnson

(57) ABSTRACT

An electrode structure has an interdigitated layer of at least a first material and a second material, the second material having either higher or similar electrical conductivity of the first material and being more ionically conductivity than the first material, a cross-section of the two materials being non-rectangular.

7 Claims, 7 Drawing Sheets

(56) References Cited

U.S. PATENT DOCUMENTS

| | | |
|---|---|---|
| 3,752,616 A | 8/1973 | Matsui et al. |
| 3,860,036 A | 1/1975 | Newman, Jr. |
| 4,511,528 A | 4/1985 | Kudert et al. |
| 5,094,793 A | 3/1992 | Schrenk et al. |
| 5,143,681 A | 9/1992 | Daubenbuchel et al. |
| 5,154,934 A | 10/1992 | Okamoto |
| 5,628,950 A | 5/1997 | Schrenk et al. |
| 5,843,385 A | 12/1998 | Dugan |
| 5,851,562 A | 12/1998 | Haggard et al. |
| 5,882,694 A | 3/1999 | Guillemette |
| 6,109,006 A | 8/2000 | Hutchinson |
| 6,676,835 B2 | 1/2004 | O'Connor et al. |
| 6,981,552 B2 | 1/2006 | Reddy et al. |
| 7,090,479 B2 | 8/2006 | Kegasawa et al. |
| 7,690,908 B2 | 4/2010 | Guillemette et al. |
| 7,700,019 B2 | 4/2010 | Lavoie et al. |
| 7,765,949 B2 | 8/2010 | Fork et al. |
| 7,780,812 B2 | 8/2010 | Fork et al. |
| 7,799,371 B2 | 9/2010 | Fork et al. |
| 7,883,670 B2 | 2/2011 | Tonkovich et al. |
| 7,922,471 B2 | 4/2011 | Fork et al. |
| 8,206,025 B2 | 6/2012 | Natarajan |
| 2002/0074972 A1 | 6/2002 | Narang et al. |
| 2002/0176538 A1 | 11/2002 | Wimberger-Friedl et al. |
| 2003/0111762 A1 | 6/2003 | Floyd et al. |
| 2003/0189758 A1 | 11/2003 | Baer et al. |
| 2006/0024579 A1* | 2/2006 | Kolosnitsyn ............ H01M 4/13 429/209 |
| 2007/0279839 A1 | 12/2007 | Miller |
| 2010/0003603 A1 | 1/2010 | Chiang et al. |
| 2010/0239700 A1 | 9/2010 | Winroth |
| 2011/0278170 A1* | 11/2011 | Chiang et al. ................ 204/483 |
| 2012/0153211 A1 | 6/2012 | Fork et al. |
| 2012/0156364 A1 | 6/2012 | Fork et al. |

FOREIGN PATENT DOCUMENTS

| | | |
|---|---|---|
| EP | 2056352 | 5/2009 |
| EP | 2466594 | 6/2012 |
| FR | 1308573 | 11/1962 |
| JP | 9183147 | 7/1997 |
| JP | 2006326891 | 12/2006 |
| WO | 0121688 | 3/2001 |

OTHER PUBLICATIONS

European Search Report, dated Apr. 14, 2014, EP Application No. 13198599.6, 7 pages.

* cited by examiner

STRUCTURES FOR INTERDIGITATED FINGER CO-EXTRUSION

RELATED APPLICATIONS

The application is related to US Patent Publication No. 20120156364; US Patent Publication No. 20120153211; U.S. patent application Ser. No. 13/727,960; U.S. patent application Ser. No. 13/727,993; and U.S. patent application Ser. No. 13/728,016.

BACKGROUND

Numerous applications exist in which batteries, fuel cells, electrical interconnects, ultracapacitors and others benefit from tightly spaced interdigitated stripes of dissimilar materials. These materials can be co-extruded using a co-extrusion print head as disclosed in U.S. Patent Publication 2012/0156364, with a similar but alternative print head being shown in U.S. Pat. No. 7,799,371. Being co-extruded in this context mean that the materials are not mixing as they flow. However, the resulting structures have rectangular geometries in cross sectional form with a straight uniform print in the direction perpendicular to the interdigitated geometries.

However, modeling has shown that non-rectangular cross-section geometries have performance enhancement gains in capacity and energy density. Typically, electrodes result from slot coating processes or thin film and semiconductor fabrication techniques. These methods have not yet reached cost effectiveness for large scale production of structured electrodes.

DETAILED DESCRIPTION OF THE EMBODIMENTS

Figure 1:
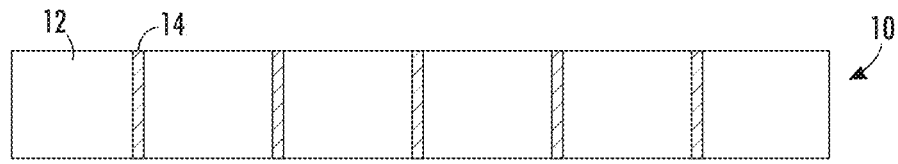
FIG. 1 shows a prior art interdigitated structure.

FIGS. 1-6 show various embodiments of structures formed using a co-extrusion print head such as that shown in U.S. Pat. No. 7,799,371. FIG. 1 shows a prior art embodiment of an electrode structure 10. The structure has a first material 12 in wider portions interdigitated with a second material 14. The material 12 consists of densely packed active electrode material, and the material 14 consists of a highly porous material for enhanced ionic or electrical conductivity. The material 14 may have more or the same electrical conductivity of the first material and will more than likely have higher ionic conductivity.

Figure 4:
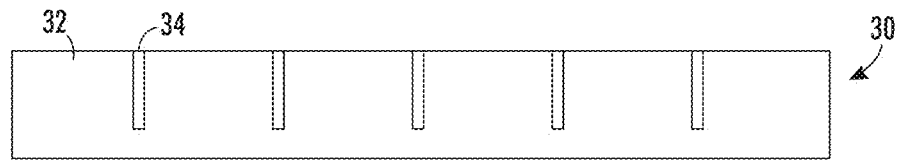
FIG. 4 shows a prior art embodiment of an interdigitated structure.

FIG. 4 shows a similar prior art scenario, except that the regions 34 result from a sacrificial material having been removed. Only the dense regions such as 32 remain. This would allow an electrolyte to file the regions in the embodiment of a battery electrode.

Figure 2:
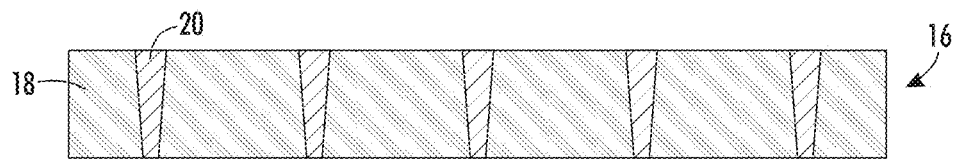
FIGS. 2-3 show embodiments of interdigitated structures.
Figure 3:
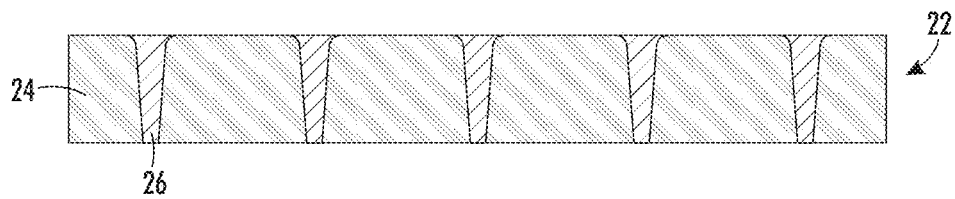

FIGS. 2-3 show densely packed regions 18 and 24, and the porous regions 20 and 26 with non-rectangular cross sections. Through control of the process conditions, such as pressure tuning, fluid flow rates and fluid rheology, the structures 16 and 22 may result. With regard to the fluid rheology, viscosity of the two materials should be matched with similar densities. However, the density may vary because of the concentrations of the conductive materials, but the matching of the viscosities remains important.

The non-rectangular cross sections of regions 18 and 24 allow better control of the concentration gradient across the electrode structures 16 and 22. These structures have more surface area of the densely packed regions exposed to the porous region. Larger concentration gradients across a battery electrode cause a larger ohmic drop, which affects the energy density and power density of a battery cell. By controlling the concentration gradient, one can avoid the large gradients and increase the efficiency of the battery cell. The non-rectangular cross-section may have sharp corners or rounded corners.

Figure 5:
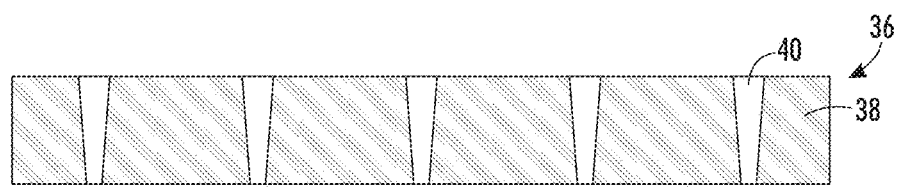
FIGS. 5-6 show embodiments of interdigitated structures.
Figure 6:
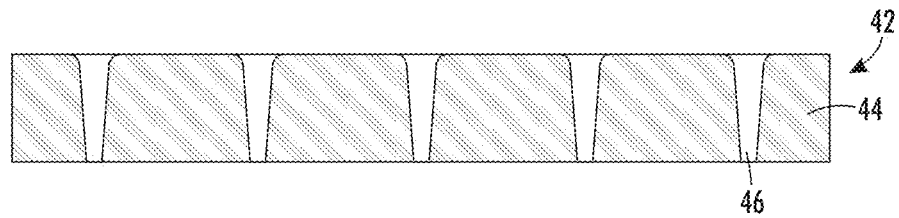

FIGS. 5 and 6 shows similar structures 36 and 42 with non-rectangular regions 38 and 44 of the densely packed material, and non-rectangular spaces such as 40 and 46. In these structures, the spaces would be filled with the electrolyte material, exposing more surface area of the densely packed material to the electrolyte.

Figure 7:
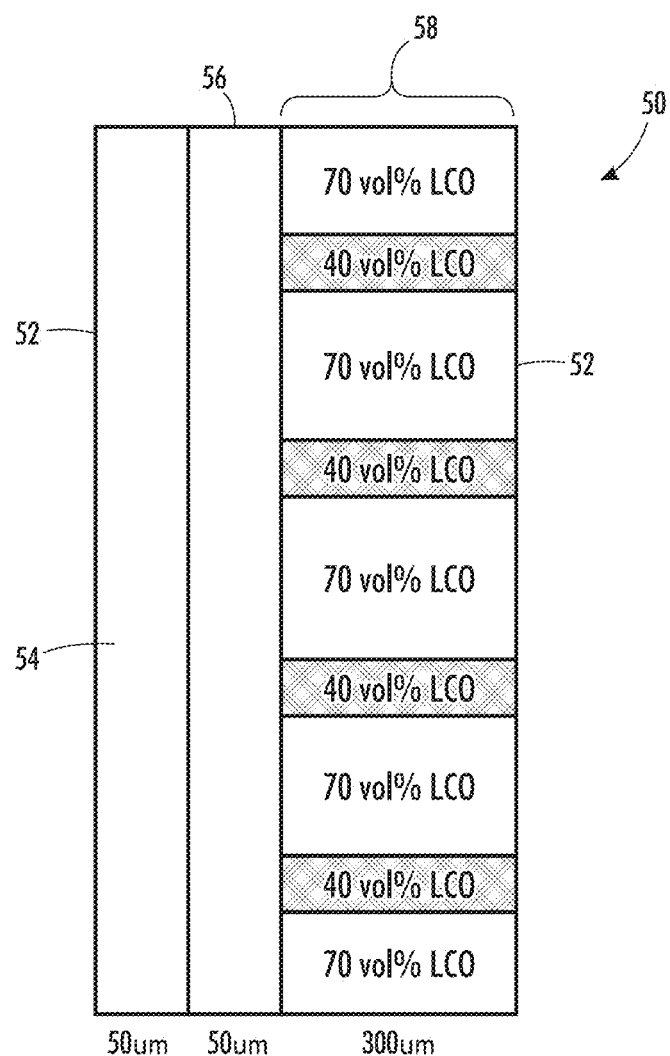
FIG. 7 shows an embodiment of a battery structure.

FIG. 7 shows a simplified block diagram of a battery model used to determine the performance improvement in the non-rectangular electrode cross sections compared to the rectangular cross section embodiments. The structure 50 has current collector boundaries 52. In this embodiment the anode 54 consists of lithium foil having at thickness in the range of 50 micrometers. A separator 56 separates the anode 52 from the cathode structure 58. The cathode structure 58 in this embodiment consists of alternating regions of densely packed and highly porous materials. While the block diagram of FIG. 7 shows these regions as rectangular, they actually have the shape of FIGS. 2 and 3. In this embodiment, the densely packed region consists of lithium cobalt oxide (LCO) at 70% concentration of active material and the highly porous regions consist of 40% concentrations of LCO.

The material may be any type of battery material with any range of active material concentration, but typically the highly porous regions will have less active material than the dense regions. Further, the materials may be used in other structures than batteries. Examples of materials that may be used include lithium cobalt oxide (LCO), lithium nickel cobalt manganese oxide (NCM), or a mixture of the two. Other materials may include lithium nickel cobalt aluminum oxide (NCA), lithium manganese oxide (LMO), lithium iron phosphate (LFeP). The anode material may be lithium titanate (LTA).

Figure 8:
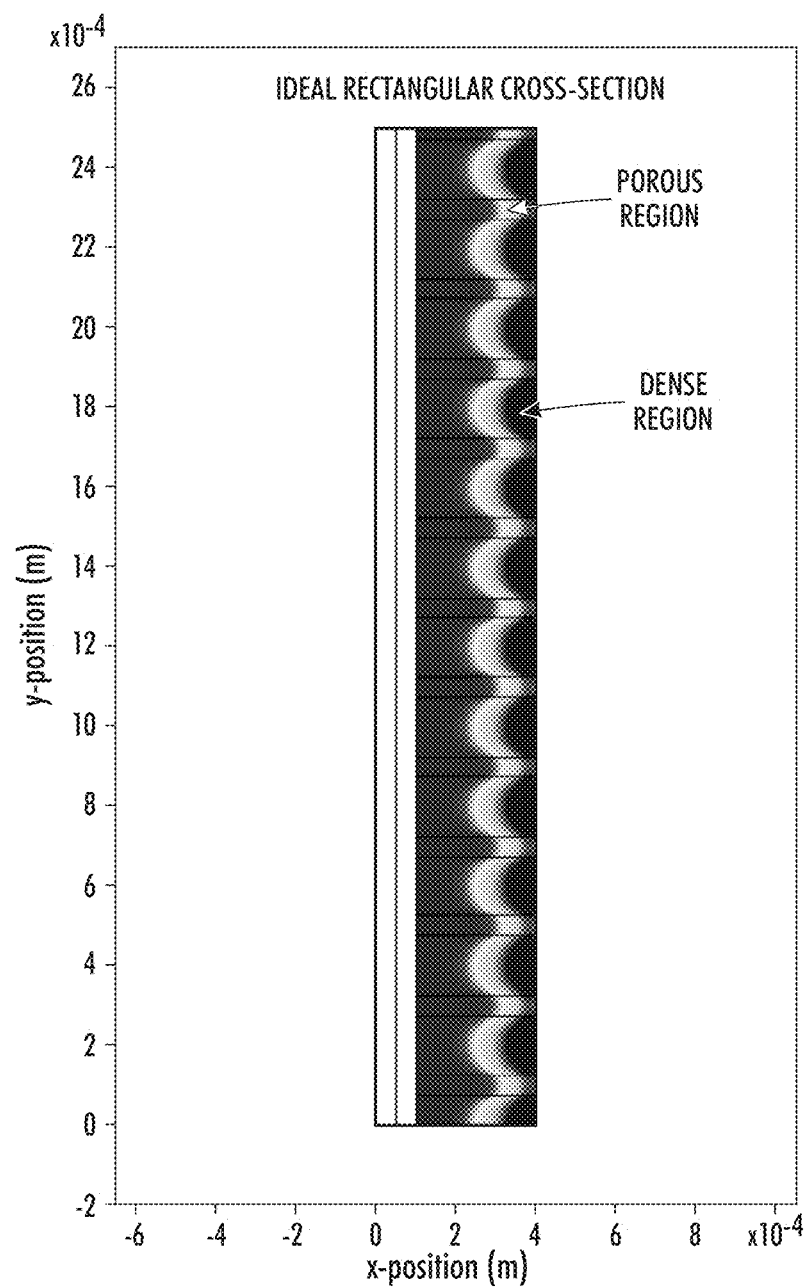
FIGS. 8 and 9 show plots of material utilization for a prior art and a current embodiment of a lithium structure.
Figure 9:
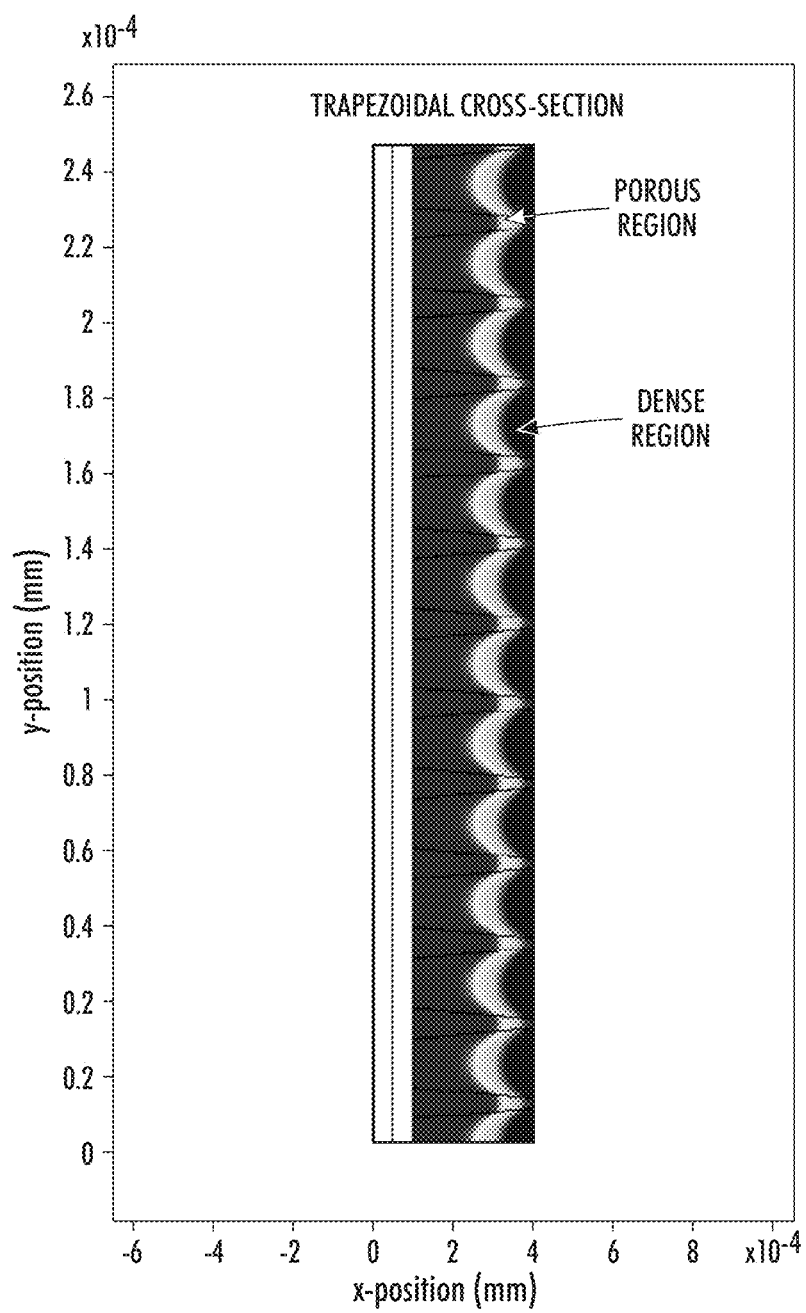

FIGS. 8 and 9 show material utilization plots for the electrode structures of FIG. 1 and FIG. 2 respectively after a '1 C' discharge, where the applied current density is 12.9 mA/cm$^2$. A 'C' rate discharge is a measure of the rate at which a battery discharges relative to its maximum capacity. A '1 C' rate is the current at which the battery will discharge its entire capacity in 1 hour. Mass and volume are conserved between the porous and dense regions of the structures with the only difference being the geometry of the cross-section. The structure of FIG. 2 has approximately 10% greater active material utilization over the structure of FIG. 1 at the 1 C rate.

Figure 10:
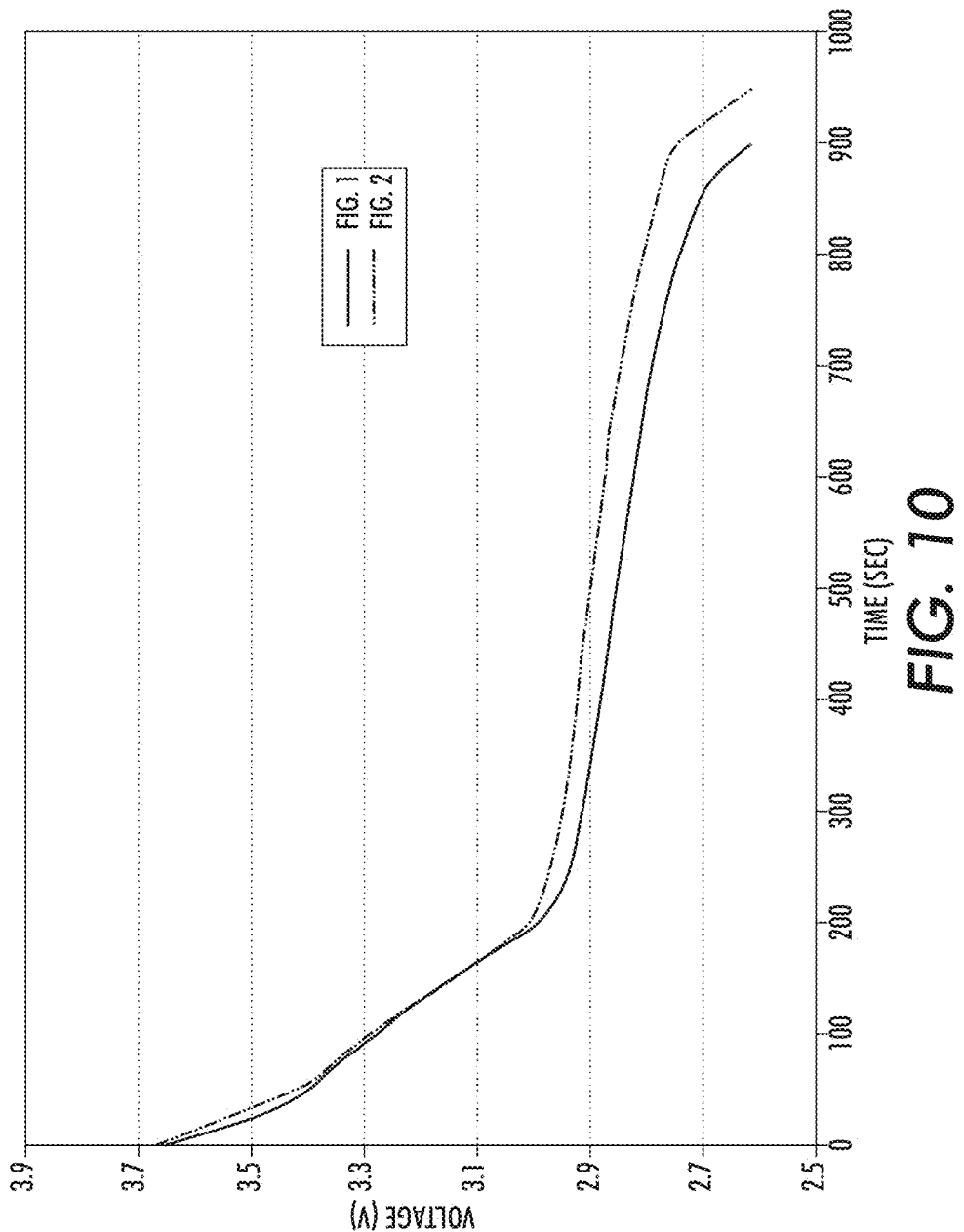
FIG. 10 shows a plot of a discharge performance between prior art and a current embodiment of a lithium structure.

The capacity, energy and power numbers in the table below show the relative performance improvement between the structures but not the absolute performance improvement on can realize for lithium cobalt oxide. FIG. 10 in conjunction with the below table shows the energy, power and capacity gains made using the non-rectangular structure. On the graph in FIG. 10, the upper line is the structure of FIG. 2 and the lower line is the structure of FIG. 1. The plots show that the structure of FIG. 2 has a longer run time and a lower voltage drop than the structure of FIG. 1. This is due to the increase in the active material utilization and the lower concentration gradient in the cathode structure.

|  | Specific Capacity (mAh/g) | Energy Density (Wh/kg) | Power Density (W/kg) |
|---|---|---|---|
| Non-rectangular | 36.126 | 106.917 | 405.160 |
| Rectangular | 34.225 | 100.318 | 401.273 |
| % Improvement | 5.6% | 6.6% | 1.0% |

As mentioned previously, these gains do not come from higher volume in the structures or more mass, merely from the change in the geometries.

Up to this point, the discussion has focused on the geometrical change of the cross section relative to battery electrode structures. However, as mentioned previously, control of the process parameters may accomplish non-rectangular structures formed by the print head as etch masks and interconnects. In this environment, the structures shown in FIGS. 5 and 6 would make up the material left behind once the sacrificial material is removed. The material could be conductive or polymer, depending upon the purpose of the material in the resulting structure. For example, for circuit interconnects, the material would be conductive, either metal or a conductive polymer, used as contacts after removal of the sacrificial material.

The print head discussed in U.S. Patent Publication 2012/0156364 has what are referred to as 'swept' flow paths, where the edges and corners of the flow paths are angled and/or beveled to alleviate dead spots where material can build up. This built up material may reach a critical mass and then burst into the flow path, or it can cause the flow path to become constricted. In either case, by sweeping the flow paths, the uniformity of the resulting material deposit on a surface is preserved in a straight monolithic pattern. However, by using 'unswept' flow paths, or by pulsing the material flow into the print head using pressure differentials or mechanical motion, one can form more randomized, undulating or 'wavy' flow patterns of the materials onto a surface.

Figure 11:
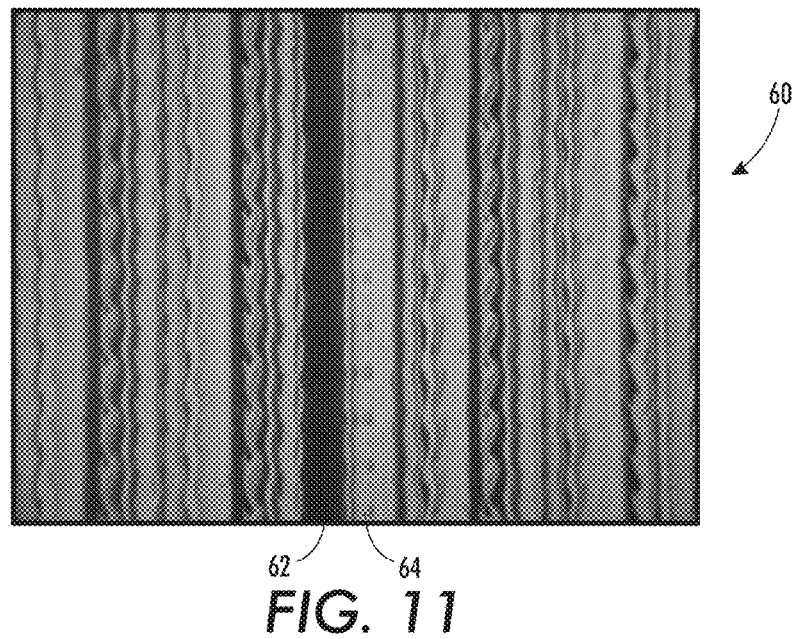
FIGS. 11 and 12 show embodiments of a wavy pattern of extruded materials.

FIG. 11 shows an example of such a randomized material pattern. The resulting deposit consists of wavy lines of the two different materials 62 and 64. As mentioned previously, one of the materials may be removed, acting as a sacrificial material. The voids left by the removal may be filled with a different material. Alternatively, the remaining material may form interconnects and contact pads, or may form an etch mask for an underlying material.

Figure 12:
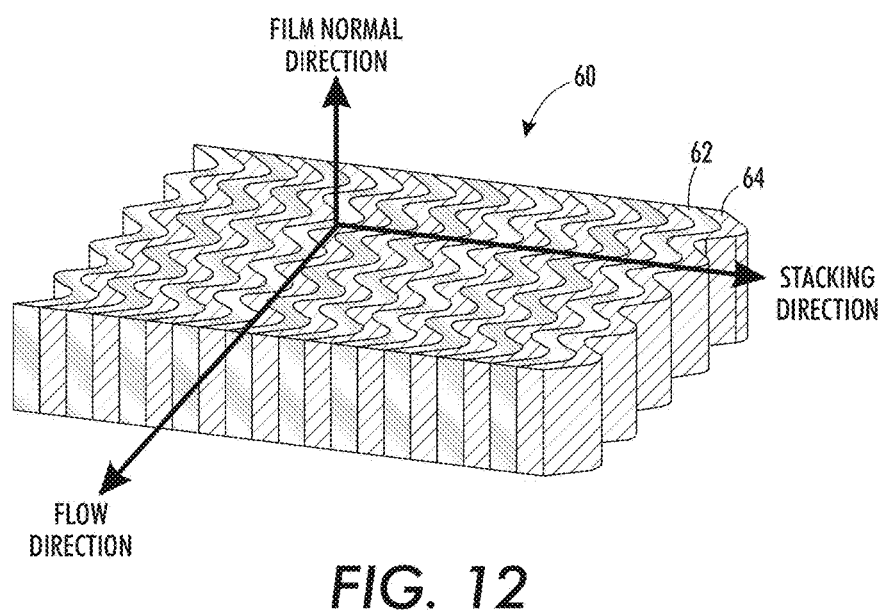

FIG. 12 shows a simplified version of the material pattern. The flow direction is defined as the direction from in which the material flows from the print head. The print head would travel from the edge of the pattern closest to the viewer, pulling back away from the viewer. The direction normal to the film would be the top view of the film. The stacking direction refers to the ability of this pattern to be 'stacked' sideways by running the print head in multiple parallel paths to form a much larger pattern by stacking smaller patterns together sideways in the direction shown.

In this manner, one can form more efficient, higher performing electrode structures for batteries by forming the electrode structures with non-rectangular cross sections. The non-rectangular structures may be formed from pre-existing print heads having swept flow paths through control of the process parameters, or from print heads similar to the pre-existing print heads, but having 'unswept' paths. Similarly, randomized structures usable as interconnects or randomized etch masks may be formed through process controls using pre-existing print heads or using the print heads with unswept flow paths.

It will be appreciated that several of the above-disclosed and other features and functions, or alternatives thereof, may be desirably combined into many other different systems or applications. Also that various presently unforeseen or unanticipated alternatives, modifications, variations, or improvements therein may be subsequently made by those skilled in the art which are also intended to be encompassed by the following claims.

What is claimed is:

1. An electrode structure, comprising:
    an interdigitated layer of alternating regions of at least a first material and a second material, the second material:
    having one of either higher or similar electrical conductivity of the first material;
    being more ionically conductive than the first material;
    having a higher porosity than the first material; and
    having less active material than the first material;
    wherein a cross-section of the two materials is trapezoidal, the electrode structure being one of either a cathode or an anode residing adjacent a separator such that the alternating portions alternate in a stacking direction, wherein the stacking direction is parallel to one of either the cathode or anode, resulting in the porosity alternating between a higher and lower porosity in contact with either the cathode or anode.

2. The structure of claim 1, wherein the trapezoidal cross-section has sharp corners.

3. The structure of claim 1, wherein the trapezoidal cross-section has rounded corners.

4. The structure of claim 1, wherein the interdigitated layer comprises one of a wavy or undulating pattern.

5. The structure of claim 1, wherein the interdigitated layer comprises a straight monolithic pattern in a print direction.

6. The structure of claim 1, wherein the cross-section of the two materials being trapezoidal comprises stripes of materials with widths narrower at one end than at an opposite end.

7. The structure of claim 1, wherein the cross-section of the two materials being trapezoidal comprises a widening stripe of one material and a narrowing stripe of the other.

* * * * *